E. DUCHESNE.
PISTON PACKING.
APPLICATION FILED APR. 10, 1911.
1,008,799.
Patented Nov. 14, 1911.
2 SHEETS—SHEET 1.
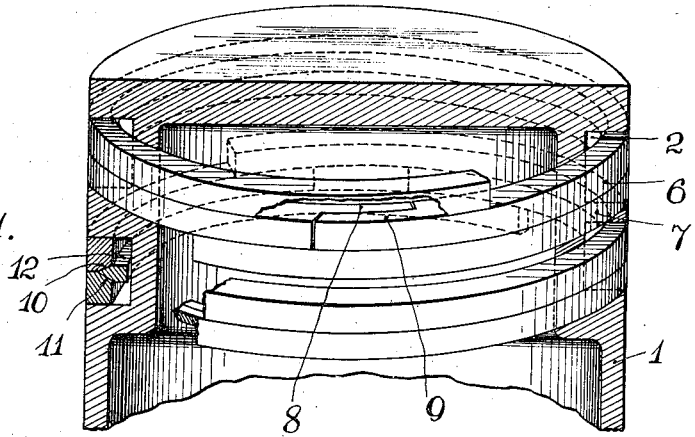
Fig. 1.
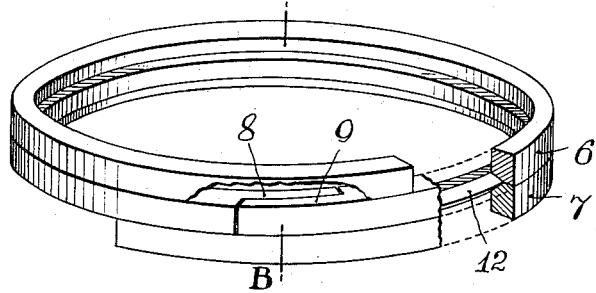
Fig. 2.
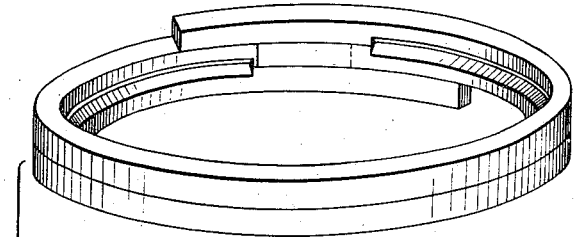
Fig. 3.
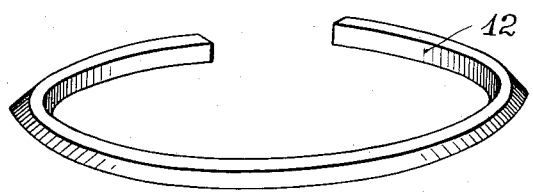
Witnesses
Inventor
E. Duchesne
By
Attorney E. DUCHESNE.
PISTON PACKING.
APPLICATION FILED APR. 10, 1911.
1,008,799.
Patented Nov. 14, 1911.
2 SHEETS—SHEET 2.
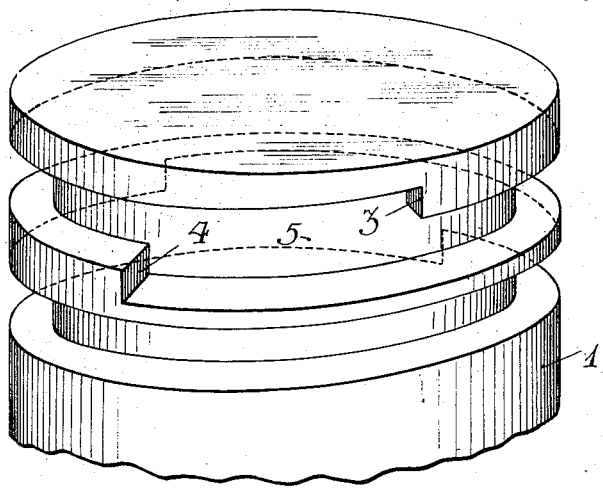
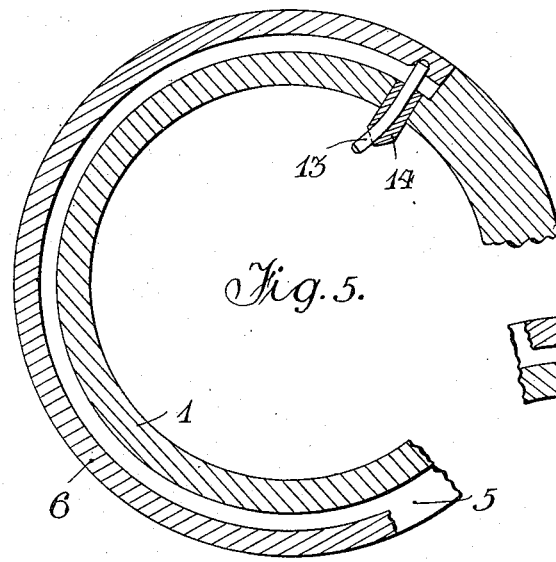
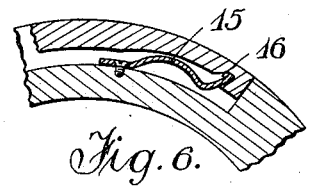
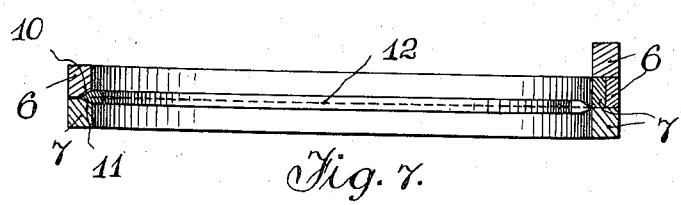
Witnesses
Inventor
E Duchesne
By
Attorney

UNITED STATES PATENT OFFICE.

ERNEST DUCHESNE, OF VIAUVILLE, MONTREAL, QUEBEC, CANADA.

PISTON-PACKING.

1,008,799. Specification of Letters Patent. Patented Nov. 14, 1911.

Application filed April 10, 1911. Serial No. 620,052.

*To all whom it may concern:*

Be it known that I, ERNEST DUCHESNE, a subject of the King of Great Britain, and resident of 80 Second avenue, Viauville, in the city and district of Montreal, Province of Quebec, Dominion of Canada, have invented certain new and useful Improvements in Piston-Packing; and I do hereby declare that the following is a full, clear, and exact description of the same.

The invention relates to piston packing, as described in the present specification and illustrated in the accompanying drawings that form part of the same.

The invention consists essentially in the novel arrangement and construction of rings in prepared grooves in the periphery of the piston.

The objects of the invention are to devise a means of effectually avoiding leakage between the piston and the cylinder, to construct a self adjusting form of ring, and generally to provide a ring comparatively cheap to manufacture and economical in regard to maintenance.

In the drawings, Figure 1 is a sectional perspective view of a portion of a piston, showing the rings partly broken away. Fig. 2 is a perspective detail of the rings assembled, showing a part thereof partly broken away. Fig. 3 are perspective details of the outer rings and the inner rings apart. Fig. 4 is a perspective detail of a portion of the piston, showing the ring grooves. Fig. 5 is a cross sectional view of a portion of the piston, showing a means of fastening a ring at one end thereof. Fig. 6 is a sectional detail, showing another means of fastening a piston ring at one end. Fig. 7 is a cross sectional view of the rings assembled on the line A—B in Fig. 2.

Like numerals of reference indicate corresponding parts in each figure.

Referring to the drawings, 1 is a piston having the grooves 2, said grooves each having the abutments or shoulders 3 and 4 forming thereby in each groove a helical passage 5.

6 and 7 are piston rings of the split form having the overlapping and reduced ends 8 and 9, said rings extending from the abutments 3 and 4 respectively, the inner wall of each ring 6 is beveled at 10, and the inner wall of each ring 7 is correspondingly beveled at 11 to form between the rings a V-shaped groove which terminates at said reduced ends 8 and 9, said split rings 6 and 7 extend helically around the piston in each groove 2.

12 is an inner ring, substantially V-shaped in cross section and extending into the V-shaped groove formed by the bevels 10 and 11 and on the inner side thereof abutting the bed of the groove 2, the same form of inner ring being used in each of said grooves 2.

13 is a pin inserted through a suitable plug 14, the latter being arranged in a corresponding hole through the wall of the piston from the inside, said pin 13 projecting into one of the grooves 2 and into a corresponding hole in the inner wall of the ring 6, adjacent to the abutment 3 and holding said ring firmly to said abutment. There is a similar pin projecting into the ring 6, adjacent to the abutment 4 and holding said ring to said abutment, therefore, there is no space left in which any leak can occur between the cylinder wall and the piston, for the overlapping ends 8 and 9 cannot separate to any extent, and if they do separate slightly, the overlap prevents any leak. The same arrangement is made with the other pair of rings.

In Fig. 6, another means is shown for holding the ring ends to the abutments 3 and 4. 15 are springs rigidly secured to the bed of the groove 2 toward each end thereof and engaging the rings 6 and 7 in the slots 16 and holding said rings to said abutments 3 and 4. Other means may be employed for holding said rings to the abutments, but they are not illustrated herein, as for instance, springs holding the other ends apart or separating the overlapping ends slightly, but it is hardly necessary to illustrate a number of forms, as some departures may be made from the construction shown and described, so long as it is kept within the limits of the claims for novelty following this specification.

The inner ring 12 is of use in keeping the rings 6 and 7 to the side walls of the grooves 2 as any tendency to loosen from said side walls will be overcome by the outward pressure of said inner ring into the V-shaped grooves formed between said rings.

What I claim as my invention is:

1. In piston packing, a piston having a helical groove therein with abutment shoulders at the extremities thereof, a pair of piston rings fitting said groove and each comprising a single helix with overlapping ends, said rings being placed together in the groove to form a continuous helix, and means for retaining the outer extremities of said continuous helix in rigid abutment with said shoulders.

2. In piston packing, a piston having a groove in the periphery thereof terminating at each end in abutments and a pair of split rings mounted on said piston in said groove and abutting said abutments and reduced at their other ends and overlapping, and means for holding said rings to said abutments.

3. In piston packing, in combination a piston having a groove in its periphery thereof terminating at each end in abutments and forming a helical passage around said piston, a pair of split helical rings mounted on said piston following the direction of said helical passage and abutting said abutments, an inner central helical ring substantially V-shaped in cross section and adapted to enter between the aforesaid rings for spreading the same, and means for holding said abutting ends to said abutments.

4. In piston packing, a piston having a helical groove in the periphery thereof terminating at each end in abutments, a pair of helical piston rings abutting said abutments and following the direction of said groove and meeting and overlapping in reduced ends, said rings having slots in the inner wall thereof adjacent to said abutments, and springs rigidly secured to said piston in the bed of said recess and engaging in said slot and holding said abutting ends to said abutments.

Signed at the city and district of Montreal, Quebec, Canada, this sixth day of April, 1911.

ERNEST DUCHESNE.

Witnesses:
G. H. TRESIDDER,
H. E. PLANTE, Jr.